United States Patent [19]

Ande et al.

[11] Patent Number: 4,877,626

[45] Date of Patent: Oct. 31, 1989

[54] METHOD FOR COLORING MEAT

[75] Inventors: Charles F. Ande; Mark E. Selz, both of Sun Prairie, Wis.

[73] Assignee: Oscar Mayer Foods Corporation, Madison, Wis.

[21] Appl. No.: 144,290

[22] Filed: Jan. 15, 1988

[51] Int. Cl.$^4$ ............................................. A23L 1/275
[52] U.S. Cl. .................................... 426/250; 426/407; 426/412; 426/641; 426/643; 426/644; 426/645; 426/302; 426/404; 426/295; 426/291; 426/293
[58] Field of Search ............... 426/250, 277, 278, 413, 426/404, 90, 105, 302, 129, 315, 534, 650, 135, 138, 140, 265, 291, 93, 95, 268, 413, 407, 412, 641, 643, 644, 645

[56] References Cited

U.S. PATENT DOCUMENTS

| | | | |
|---|---|---|---|
| 3,748,147 | 7/1973 | Hale et al. | 99/107 |
| 4,038,438 | 7/1977 | Rahman et al. | 427/385 R |
| 4,196,220 | 4/1980 | Chiu et al. | 426/105 |
| 4,442,868 | 4/1984 | Smith et al. | 138/118.1 |
| 4,446,167 | 5/1984 | Smith et al. | 426/650 |
| 4,532,141 | 7/1985 | Chiu | 426/250 |
| 4,604,309 | 8/1986 | Goldberg | 428/36 |
| 4,721,623 | 1/1988 | Coffey et al. | 426/641 |

*Primary Examiner*—Marianne Cintins
*Attorney, Agent, or Firm*—Joseph T. Harcarik

[57] ABSTRACT

A method for coloring raw meat wherein the raw meat muscle surface or meat skin is coated with a coloring solution. The coloring solution contains liquid smoke and caramel. The colored meat is then packaged and cooked.

18 Claims, No Drawings

METHOD FOR COLORING MEAT

BACKGROUND OF THE INVENTION

1. Field of the invention

This invention relates to a process for providing a smoke roast or otherwise desirable color to raw meat or meat skin with a coloring solution of liquid smoke and caramel and optionally a coloring agent such as annato. The coloring solution is added to the food product prior to packaging and cooking. After coloring, the meat is placed in a sealed package and cooked, or the meat may be cooked and then sealed in the package.

2. Description of the prior art

There are various patents dealing with the coloring of meat such as the following:

U.S. Pat. No. 4,196,220 (Chiu et al.)

This patent discloses the treatment of a tubular food casing with a mixture of albumin and liquid smoke for imparting smoke flavor and color to the casing. This is an example of the use of a liquid smoke composition combined with a diverse additive to color and flavor meat products.

U.S. Pat. No. 3,748,147 (Hale et al.)

This patent discloses a process for pigmenting poultry involving scalding, plucking and applying a pigment to dye the poultry. Annato solution (bixin) is used as one of the pigments. This reference is included to show the use of annato solution to color poultry.

U.S. Pat. No. 4,038,438 (Rahman et al.)

A method is disclosed for coloring synthetic food casing manufactured from cellulose and collagen wherein the casing is impregnated with a solution containing caramel and thereafter the caramel is cross-linked and insolubilized. This reference is cited to show the use of caramel to color meat products.

U.S. Pat. Nos. 4,442,868 (Smith et al.);
4,446,167 (Smith et al.);
4,532 (Chiu et al.); and 4,604,309 (Goldberg)

These references all disclose the use of liquid smoke compositions for coloring casings and food products. Each of them provides a slightly different food casing, or liquid smoke product for use in coloring. None of these references disclose the use of diverse additives, such an annato solution or caramel color, in the coloring compositions.

U.S. Pat. Application No. 642,014 Filed Aug. 20, 1984; now U.S. Pat. No. 4,721,623

A method is disclosed for imparting a roasted color by applying atomized caramel to meat and then cooking.

It is believed that caramel and liquid smoke have separately been used on cooked meat to provide uniform coloring and smoke coloring to the cooked meat, but heretofore uniform coloring of raw meat with caramel has been unattainable.

It is desired to obtain a uniform coloring on raw meat prior to cooking. This allows packaging of the raw meat prior to cooking.

It is an object of this invention to add color to the meat prior to cooking and then either cook the meat before or after packaging. It is a further object of this invention to provide a uniform coloring that is not blotchy.

It is also an object of this invention to provide a dark, golden color throughout the exposed surface of the meat or meat skin.

SUMMARY OF THE INVENTION

This invention pertains to a method for coloring meat and, in particular, poultry. The meat is colored by coating either meat muscle surface or meat skin with a coloring solution. The coloring solution is comprised of liquid smoke and caramel and optionally a coloring agent such as annato. After coloring, the meat is cooked and packaged. The cooking may occur before or after packaging.

It has been determined that when this invention is employed a desirable uniform coloring without a blotchy appearance is obtained and also the coloring is a dark desirable smoke color.

DETAILED DESCRIPTION OF THE INVENTION

According to this invention, raw meat which may be poultry such as turkey and chicken, red meat such as beef and pork, and fish is colored. Either the meat skin or exposed muscle surface is colored. Suitably, the meat to be colored is poultry. When poultry is employed the raw poultry meat muscle may first be injected with a cure or brine solution. Typically, a cure solution would contain water, salt, sugar, sodium phosphates, sodium erythorbate, liquid smoke, cure mix and garlic powder. The cure solution or brine solution may also contain carrageenan. Cure solutions are typically used in a weight percent ranging from 5 to 30 based on the weight of the meat and their use is well known in the art. After injection of the cure or brine solution, the poultry is suitably tumbled for a period of 0 to 24 hours. Carrageenan may also be added during tumbling. Suitably, the poultry is placed on a mold and the poultry may be skinless, skinless with the skin unattached (toupee) or with the skin attached (non-toupee).

The coloring solution contains from 1% to 30% caramel and from 40% to 99% liquid smoke. More preferably, the caramel is from 5% to 15% and the liquid smoke is from 50% to 80%. The coloring solution may optionally contain a coloring agent such as bixin which is suitably obtained by using annato. When a coloring agent is employed, there is generally 0.1% to 10% and, more preferably, 1% to 6%.

By caramel it is meant an amorphous, dark brown, deliquesent powder or a thick liquid having a bitter taste, a burnt sugar odor and a specific gravity of approximately 1.35. It is soluble in water and dilute alcohol. Caramel is prepared by the careful, controlled heat treatment of carbohydrate or saccharide materials such as dextrose, invert sugar, lactose, malt syrup, molasses, sucrose, starch hydrolysates and fractions thereof. Other materials which may be employed during heat treatment to assist caramelization include acids (e.g. acetic acid, citric acid, phosphoric acid, sulfuric acid and sulfurous acid); and salts (e.g. ammonium, sodium or potassium carbonates, bicarbonates, dibasic phosphates or monobasic phosphates).

In one process of manufacturing caramel described in U.S. Pat. No. 3,733,405, a liquid sugar, either cane or corn, is pumped into a reactor vessel along with one or a combination of the reagents authorized by the U.S. Food and Drug Administration and the mixture is heated. Temperatures ranging from 250° to 500° are maintained and the product is held between 15 and 250 pounds per square inch pressure (psi) while the polymerization takes place. When processing is completed the product is discharged to a flash cooler which drops the temperature to 150° F. It is then filtered, cooled and pumped to storage.

A commercially available powdered caramel is available from the S. Twitchell Company and designated as Caramel Color T-717. This caramel product is described by the manufacturer as a dehydrated, hygroscopic, powdered food color made entirely from corn syrup greens by heating under controlled conditions and has the same characteristics as liquid caramel color except that the water has been removed. Caramel Color T-717 has the following specifications:

Moisure - 3.50% max.
Insoluble Material - 0.50% max.
pH in 50% Solution - 3.16 +0.3
and contains
Sodium - 1580 ppm
Potassium - 108 ppm
Carbohydrates - 76.65%
Ash - 0.70%

By liquid smoke it is meant a solution of natural wood smoke constituents. The liquid smoke is produced by the limited burning of hardwoods and the absorption of the smoke so generated into an aqueous solution under controlled conditions. The limited burning keeps some of the undesirable hydrocarbon compounds or tars in an insoluble form, thereby allowing removal of these constituents from the final liquid smoke. Thus, by this procedure, the desirable wood constituents are absorbed into the solution in a balanced proportion and the undesirable constituents may be removed. The resultant liquid smoke solution is representative of the whole preferred spectrum of smoke colors and flavors without a preference of any one type. The apparatus and method for manufacturing typical liquid smokes of the preferred type is more fully described in U.S. Pat. Nos. 3,106,473 to Hollenbeck and 3,873,741 to Melcer et al.

Certain liquid smokes have been approved for use in foods by the U.S. Food and Drug Administration and the Meat Inspection Division of the U.S. Department of Agriculture. Exemplary of suitable commercially available liquid smokes are CHARSOL from Red Arrow Products Co.; LIQUID HICKORY SMOKE from Hickory Specialties, Inc.; GRIFFITH'S NATURAL SMOKE FLAVOR from Griffith Laboratories Inc.; and SMOKAROMA LIQUID SMOKE CODE 10 from Meat Industry Suppliers, Inc. Also suitable is an aqueous liquid smoke such as disclosed in U.S. Pat. No. 3,117,007 to Hollenbeck. The invention is not limited to those liquid smokes specified herein, but may include others selected by those skilled in the art. The liquid smokes may be used individually or as mixtures of various liquid smokes.

By bixin it is meant a red-brown carotenoid acid ester constituting the chief coloring matter of annato. Annato is a red or yellowish red dye stuff, containing bixin prepared from the pulp surrounding the seeds of the annato tree.

The coating with the coloring solution may be done employing conventional coating techniques such as spraying, atomizing, drenching and dipping. Excess coloring solution may be blown off such as by using pressurized air. After a coloring, the product is cooked and packaged or the product may be packaged before cooking. It has been found that when this coloring solution is used a dark uniform coloring occurs over the area of the raw meat or meat skin that is intended to be colored. Obtaining a uniform and dark color with uncooked meat is an unexpected and surprising result. For example, if caramel alone is used on uncooked meat, it is found that the coloring is blotchy and not fixed to the meat and thus may readily be removed. Liquid smoke alone results in a very light color and has the effect of merely looking stained rather than colored. Thus, it is not expected that combining the two would result in a uniform fixed dark color on raw, uncooked meat.

This result is of particular advantage when the cooked meat is packaged prior to cooking since the product need not be removed from the cooking package prior to distribution. This results in a substantial extention of the product shelf life. For example, shelf lives at refrigerated temperatures may be extended from about 50 days to about 120 days or more.

In order to cook a poultry product, standard cooking techniques are employed and it is desirable to cook the poultry to an internal temperature of approximately 160° F. as is well known in the art. Furthermore, standard packaging techniques, such as vacuum-packaging, are used in order to package the colored poultry product.

When bixin or annato is optionally employed as a coloring agent with the coloring, desirable golden dark color is obtained. Other coloring agents, well known to those skilled in the art, may be employed to obtain other desirable colors such as other carotenoids.

We claim:
1. A method for coloring raw meat which comprises coating raw meat muscle surface or raw meat skin wherein the meat is selected from the group consisting of poultry, red meat and fish with a coloring solution comprising liquid smoke and caramel wherein the coloring solution contains from 40% to 99% liquid smoke and from 1% to 30% caramel and then cooking and packaging the coated meat; thereby obtaining a raw uncooked meat having a uniform fixed dark color.

2. A method according to claim 1 wherein the meat is poultry.

3. A method according to claim 1 wherein the coated meat is packaged before cooking.

4. A method according to claims 1 wherein the coated meat is cooked before packaging.

5. A method according to claim 1 wherein the coloring solution contains from 50% to 80% liquid smoke.

6. A method according to claim 1 wherein the coloring solution contains from 5% to 15% caramel.

7. A method according to claim 2 wherein the method for coloring poultry further comprises injecting a cure or brine solution into the meat muscle.

8. A method according to claim 7 wherein the cure or brine solution contains carrageenan.

9. A method according to claim 2 wherein the muscle is tumbled with carrageenan prior to coating.

10. A method according to claim 2 which further comprises placing the poultry muscle on a mold prior to coating.

11. A method according to claim 1 wherein the meat is packaged by vacuum packaging.

12. A method according to claim 10 wherein the poultry is skinless.

13. A method according to claim 12 wherein the skinless poultry is surrounded with unattached skin.

14. A method according to claim 1 wherein the poultry is surrounded with attached skin.

15. A method according to claim 1 wherein the coloring solution further comprises a color agent.

16. A method according to claim 15 wherein the coloring agent is bixin or annato.

17. A method according to claim 16 wherein the coloring solution contains from 01.% to 10% annato.

18. A method according to claim 1 wherein the coloring solution is coated by spraying, atomization, drenching or dipping.

* * * * *